United States Patent [19]

Petkov et al.

[11] Patent Number: 4,558,579
[45] Date of Patent: Dec. 17, 1985

[54] APPARATUS FOR HYDROPLASTIC PROCESSING OF TUBULAR PRODUCTS

[75] Inventors: Georgi K. Petkov; Botyo P. Botev; Ivan H. Naydenov; Georgi M. Metev; Yakim N. Petrov, all of Gabrovo, Bulgaria

[73] Assignee: NPSP po Hydroplastichna Obrabotka na Metalite, Gabrovo, Bulgaria

[21] Appl. No.: 552,463

[22] Filed: Nov. 16, 1983

[30] Foreign Application Priority Data

Jan. 11, 1983 [BG] Bulgaria ............................ 59297

[51] Int. Cl.$^4$ ............................................ B21D 22/00
[52] U.S. Cl. ............................................ 72/56; 72/356; 72/405; 72/479
[58] Field of Search ............... 72/352, 356, 405, 479, 72/421, 56

[56] References Cited

U.S. PATENT DOCUMENTS

| | | | |
|---|---|---|---|
| 3,470,729 | 10/1969 | Andes | 72/479 |
| 3,478,563 | 11/1969 | Bozel | 72/405 |
| 4,175,417 | 11/1979 | Vergnani | 72/356 |
| 4,471,644 | 9/1984 | Kimbell | 72/405 |

Primary Examiner—Leon Gilden

[57] ABSTRACT

Apparatus for the hydroplastic processing of tubular products which finishes the inner surfaces of such products while attaining exact outer dimensions thereof. The apparatus employs a vertical hydraulic press having a movable slide and a work table therebeneath. To the slide there is attached a device for the hydroplastic processing of tubular products, and on the workpiece of the press there is secured a positioning fixture bearing at least one die adapted to have a billet introduced thereinto. Secured to the slide of the press is a carrying plate and beneath the carrying plate and spaced therefrom there is a base plate upon which there are mounted a vertical broaching rod and, laterally spaced therefrom, a knockout rod. The positioning fixture is selectively movable to bring the die thereon into a first working position, in which it is aligned with the broaching rod, and selectively moving it into a second working position, in which the die with the now fully worked tubular product being disposed in alignment with the knockout rod. On one side of the work table there is positioned a billet loading unit, and on the other side of the work table there is disposed a handling manipulator for transporting work tools to be secured to the lower end of the broaching rod. Means are provided beneath the work table for the carrying away of finished tubular products which are pushed from the die in the second work position thereof by the knockout rod.

12 Claims, 6 Drawing Figures

APPARATUS FOR HYDROPLASTIC PROCESSING OF TUBULAR PRODUCTS

This application is related to the following Petkov et al. U.S. Pat. applications: (1) Ser. No. 551,718, filed Nov. 15, 1983; (2) Ser. No. 559,975, filed Dec. 9, 1983; and (3) Ser. No. 552,504, filed Nov. 17, 1983, all of which are co-assigned with the present application.

This invention relates to an apparatus for the hydroplastic processing of tubular products. The invention is applicable to the finishing of the inner surface of tubular products while attaining an exact outer dimension. The invention may be employed for the processing of cylinders, sleeves and similar articles which require a high degree of smoothness of their working surfaces.

A known apparatus is described in Author's Certificate of Peoples Republic of Bulgaria, No. 23783 for the processing of cylindrical bodies through hydroplastic deformation wherein, depending on the type of die, processing can be achieved with the requiste smoothness of the finished product only on the inner hole or bore of the product, or the outer surface to be profiled, while finishing the inside of the product with the requiste degree of smoothness. This known apparatus is a press to the slide of which there is affixed a high pressure hydraulic cylinder, powered by a separate source of high fluid pressure. To the piston rod of the high pressure cylinder there is connected and sealed a tool for hydroplastic deformation, hereinafter for convenience called the work tool, such tool being a smooth broach with a blind center hole connected through radial grooves with the roots of the teeth of the broach. The grooves of the work tool are also connected to the high pressure space of the hydrocylinder, thus insuring the forced hydroplastic deformation of the work surface and the tool. To the work table of the press there is attached a rim member which incorporates a die for containing the tubular billet being processed. The billet itself is supported at its lower end by a telescopic carrying support therefor.

Both operations, that is the finishing of the inner surface and the finishing of the outer surface of the workpiece, can be carried out either in separate or simultaneous operations, with the device described above, but such device has a number of disadvantages; the major disadvantage is its low rate of productivity becasue of the fact that hydroplastic processing is carried out at one work station. The billets are manually loaded. An essential technical shortcoming of such prior device is the fact that the metal always flows out between the die and the telescopic carrying support during formation, thus locking the billet being processed in the die. This requires the whole sub-assembly made up of the component, carrying supports etc. to be detached from the other parts of the apparatus following every operation in order that the support and the component can be separated, and forcing it back to the encompassing rim member of the device. This makes the whole apparatus not very efficient.

The present invention has among its objects the provision of an apparatus for the hydrostatic processing of tubular products which operates with a continuous automatic cycle including the individual operations, while insuring the unimpeded and independent removal of the finished products.

This object is attained by the apparatus of the invention for hydroplastic processing, such apparatus includes a vertical hydraulic press of well-known design, to the movable slide of which there is attached a device for hydroplastic processing by deformation of the product being processed, and to the work table of the press there being attached die adapted to receive a billet introduced therewithin.

In accordance with the invention the apparatus for hydroplastic processing includes a carrying plate carried by the slide of the press, a high pressure hydraulic cylinder being attached to the carrying plate, the piston of such high pressure cylinder being fixed to a base plate carrying two broaching rods which push the work tools through workpieces disposed in respective dies, and two rods which push the finished parts out of the dies. The carrying plate and the base plate are connected by guide columns which are attached to the base plate and pass freely through the carrying plate. The broaching rods, which are located in a diametral plane perpendicular to the diametral plane of the pushing rods, have seats tightly receiving the ends of the work tools, and are connected to the work space of the high pressure hydraulic cylinder through throttling valves. The pushing or knock-out rods are provided with axial compensators whereby to adjust their length, each of the pushing rods being rotatably driven by a hydrocylinder which drives a rack gear meshing with a pinion on the respective pushing rod.

On the work table of the press there is mounted a positioning fixture; on one side of the fixture there is disposed a device for loading billets, and on the other side of the fixture there is disposed a handling manipulator for the work tools. Under the work table there is disposed a device for transporting the finished parts away from the forming apparatus. The positioning fixture consists of an indexing table with a number of, and location of, work stations corresponding to the broaching and pushing rods of the apparatus. The table is periodically turned through 90° in opposite directions. Thus there are formed two processing and two pushing or knock-out stations, each of which is equipped with a die in which a billet to be processed is introduced.

The billet loading device consists of two hoppers with separators, and a double-grip manipulator disposed in between them.

The handling manipulator consists of a base mounted on the press by columns, there being a carriage mounted for movement upon horizontal columns on the press, a mechanical manipulating arm being fixed to the carriage.

The advantages of the apparatus for hydroplastic processing in accordance with the invention are as follows: the productivity rate is improved several times as compared with the above-described prior apparatus, since every working stroke is accompanied by both a processing stroke and a pushing of the finished products from the dies. A complete automation of the whole process is attained, from the leading-in of the billets to the dies to the transportation of the finished products, all of such steps being carried out with a high degree of accuracy and smoothness.

The invention will be more fully understood upon reference to the accompanying drawings, wherein.

Figure 1:
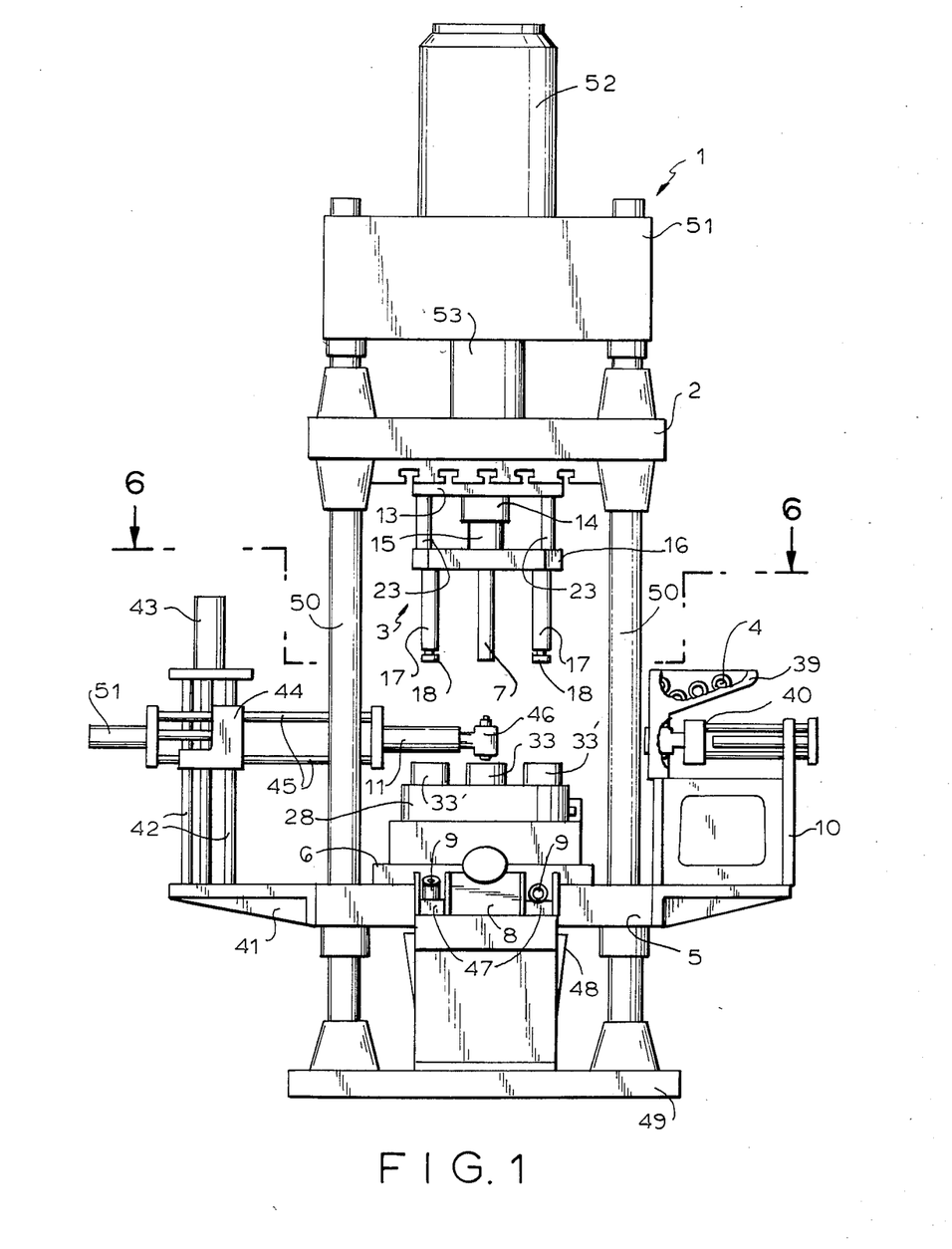
FIG. 1 is a general view of the apparatus in side elevation.
Figure 2:
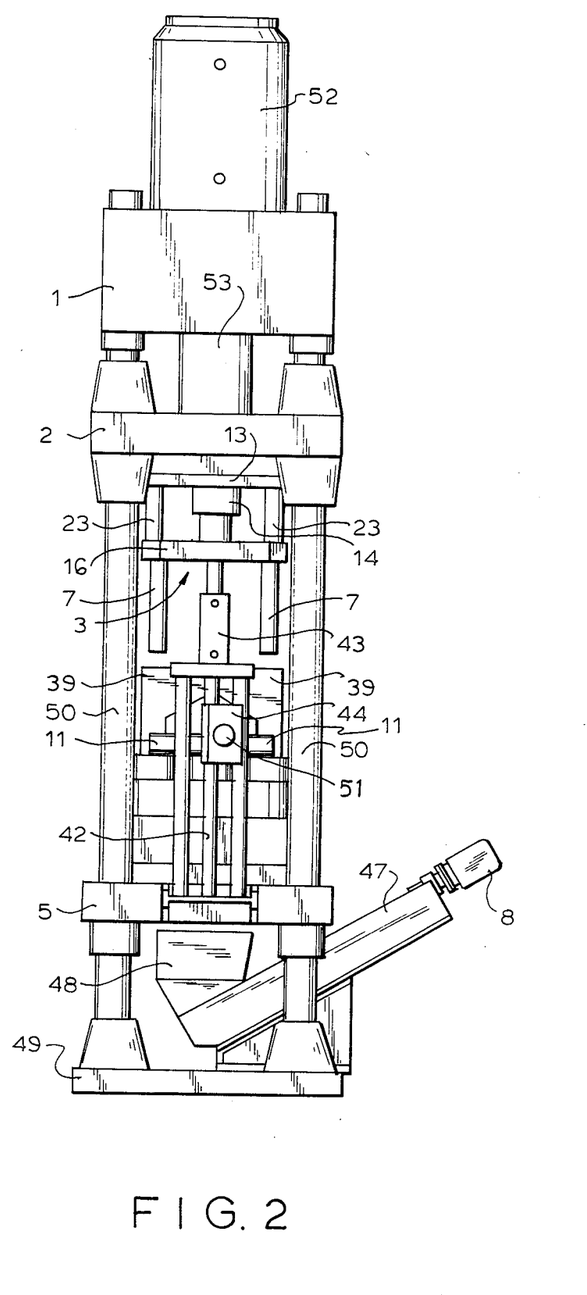
FIG. 2 is a similar view but in end elevation.

Turning first to FIGS. 1 and 2, the apparatus for hydroplastic processing in accordance with the invention includes a vertical four-column hydraulic press 1 having a main hydraulic cylinder 52, a base 49, and four columns 50 rising therefrom to a head member 51 and the main hydraulic cylinder 52. The hydraulic cylinder 52 has a piston (not shown) therein from which there extends a piston rod 53. Secured to the lower end of piston rod 53 is a reciprocable slide 2 which is guided upon the four columns 50. It to be understood that the cylinder 52 is double-acting, and that it is alternately fed with fluid under pressure at both the upper and lower ends thereof whereby to reciprocate the piston therewithin.

Figure 3:
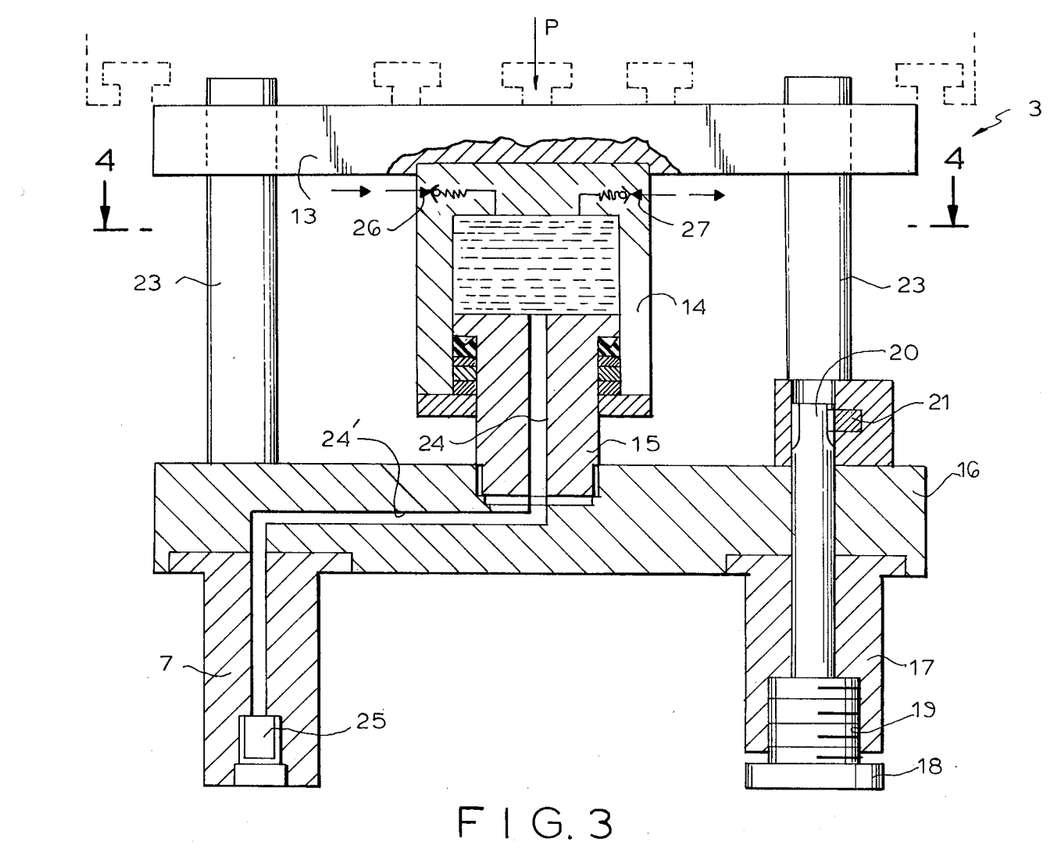
FIG. 3 is a view in vertical section through a portion of the apparatus of FIGS. 1 and 2, the section being taken along the broken section line 3–3 in FIG. 4.

Secured to the lower surface of the reciprocable slide 2 there is a device 3 for hydroplastic processing of hollow billets 4. Such processing device is more fully shown in FIG. 3, which will be described hereinafter.

A work table 5 is supported on the columns 50 above and near the base 49 of the press. Upon the upper surface of the work table 5 there is mounted a positioning fixture 6 having a body 28 upon which a table 32 is mounted for rotation about a central vertical axis. Table 32 carries two sets of dies 33, 33 and 33', 33', the dies in each set being disposed diametrically opposite each other and equally spaced from the center of the table 32, the diameters containing the axes of the respective sets of dies being disposed at 90° degrees with respect to each other. Such relationship of the dies in each set and of the sets of dies with respect to each other is most clearly shown in FIG. 6.

Figure 4:
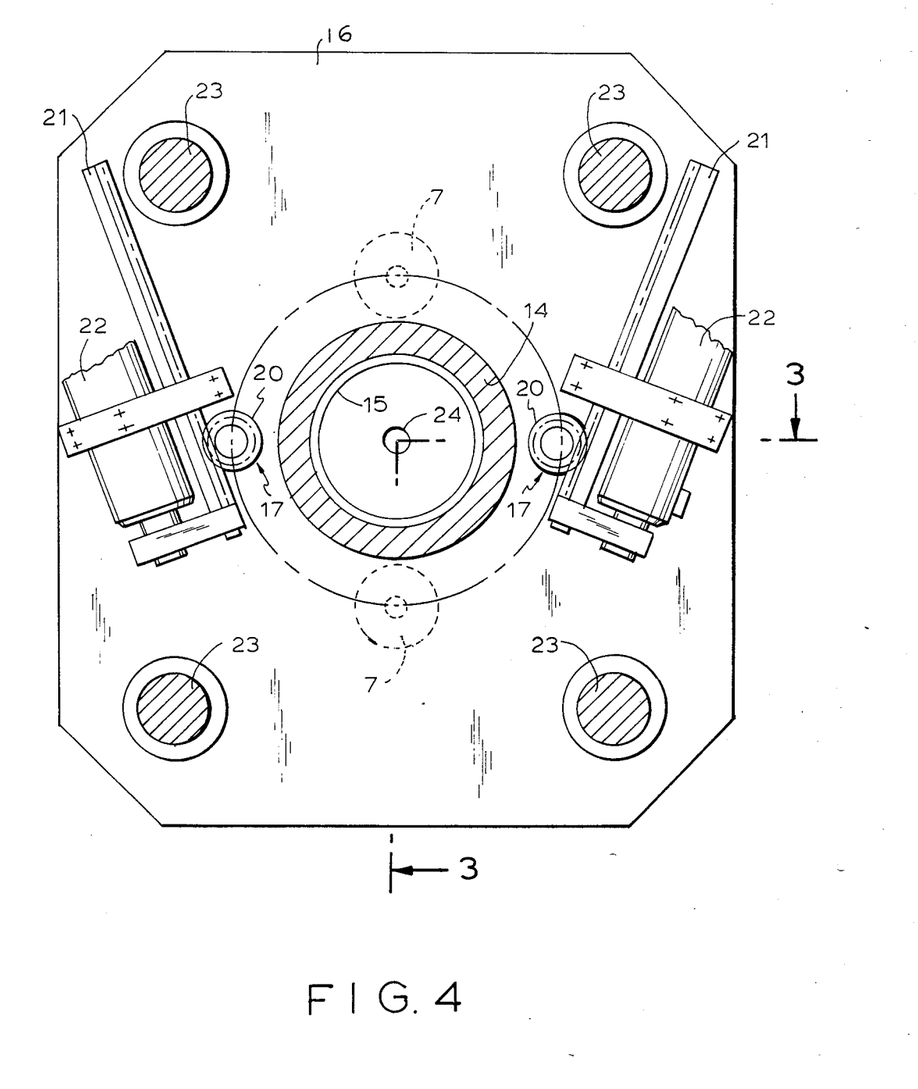
FIG. 4 is a view in horizontal section taken along the line 4—4 in FIG. 3.
Figure 5:
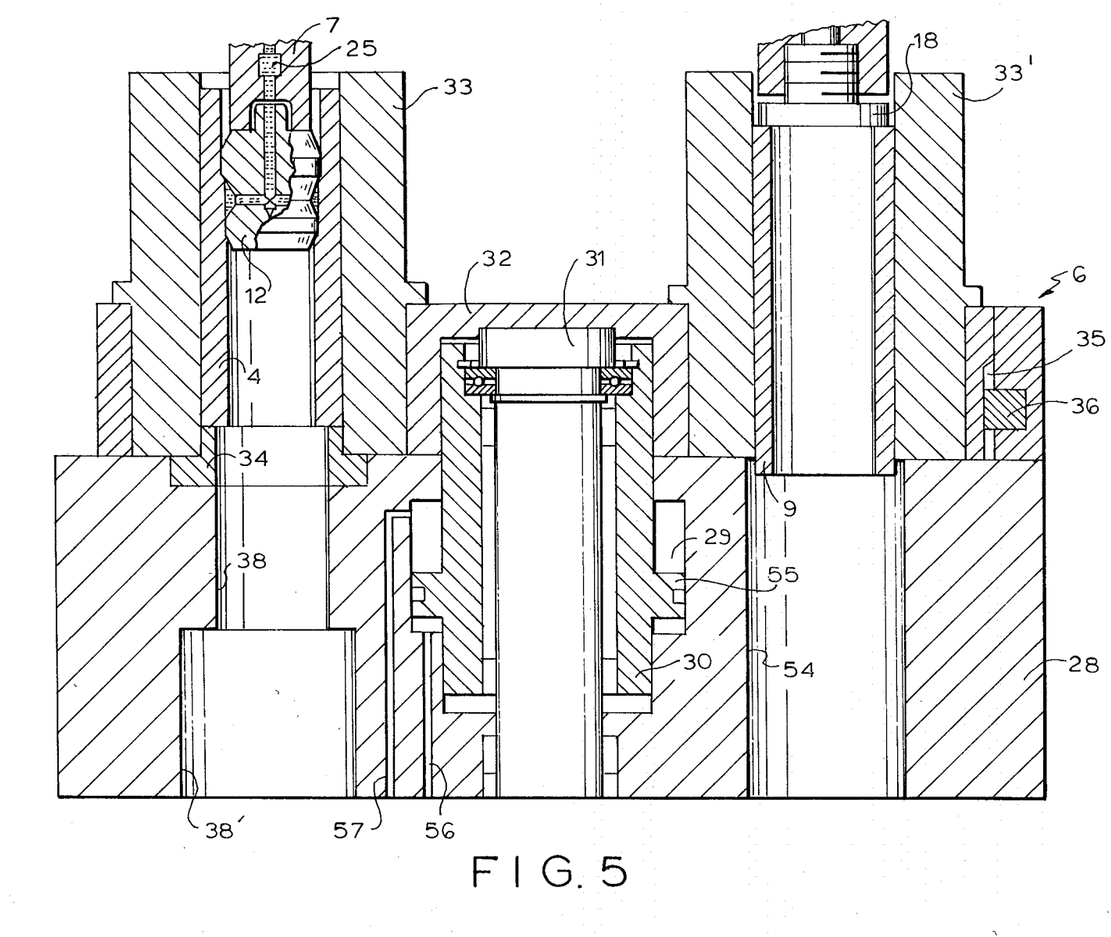
FIG. 5 is a view in section similar to that of FIG. 3 but showing a portion of the apparatus beneath that shown in FIG. 5.
Figure 6:
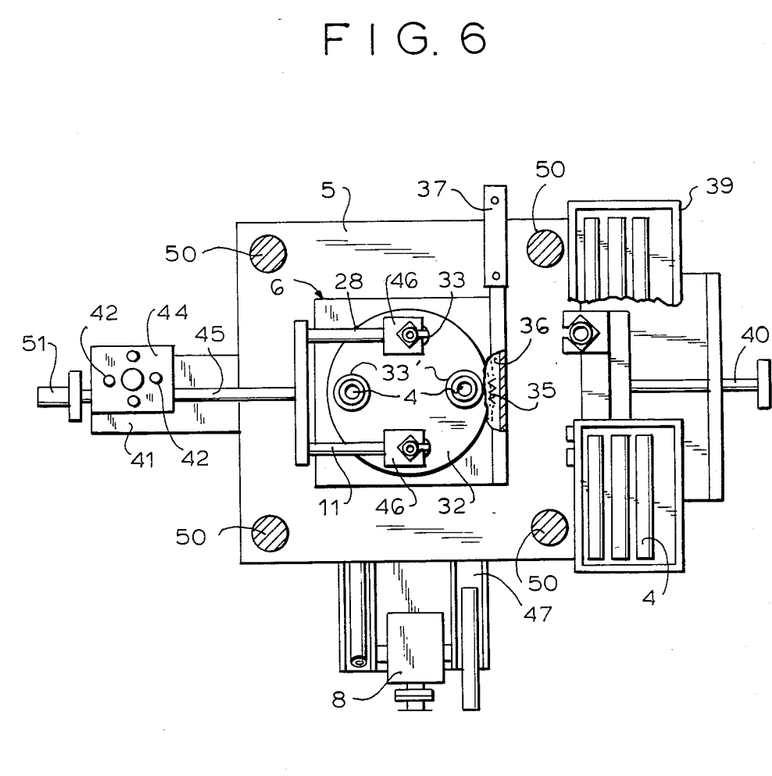
FIG. 6 is a view in transverse section taken along the broken section line 6—6 in FIG. 1.

The device 3 for the hydroplastic processing of hollow billets includes a carrying plate 13 secured to the lower face of the reciprocable slide 2, there being a high pressure hydraulic cylinder 14 provided with a piston 15 interposed between the carrying plate 13 and a base plate 16 which is mounted for vertical reciprocation upon four guiding columns 23 affixed to the base plate 16 and having a sliding fit with carrying plate 13. Secured to and depending from the base plate 16 are two broaching rods 7 mounted coaxial with the respective dies in one set thereof disposed at one operating station, and two pushing or knock-out rods 17 mounted coaxial of respective ones of the other set of dies at such station. This relationship is shown in FIGS. 1, 4 and 6. Each of the broaching rods 7 carries a working tool 12 removably mounted in fluid tight relationship on its lower end, as shown in FIG. 5, the tool entering a hollow billet 4 and reducing the thickness of the wall thereof when the slide 2 with the carrying plate 13, base plate 16, the broaching rods 7, and the pushing rods 17 are thrust downwardly by the hydraulic cylinders 52 and 14.

Each of the pushing rods 17 has an adjustable foot or axial compensator 18 on its lower end, member 18 having a threaded shank of reduced diameter connected to a threaded socket 19 at the lower end of the pushing rod 17. The upper end of each pushing rod 17 is provided with a pinion 20 which meshes with a respective rack gear 21 reciprocated by a respective double-acting hydraulic cylinder 22, as shown most clearly in FIG. 4.

The cylinder 14 is supplied with hydraulic fluid under high pressure through flexible conduit means (not shown) connected to an inlet check valve 26, the cylinder having an outlet valve 27 for permitting the escape of air from the interior of the cylinder. The piston 15 has a central passage 24 therein communicating with the space within the cylinder above the piston, passage 24 communicating with a further passage 24' which is disposed partially within the base plate 16 and partially within the broaching rods 7. A throttling valve 25 disposed within the lower end of each of the broaching rods 7 communicates with the lower end of the passage 24'. It will thus be apparent that as the slide 2 is lowered by the main hydraulic cylinder 52 of the press 1 it carries the carrying plate 3 with it so that not only are the working tools 12 introduced within the central opening in the billets 4, but that such action causes the body of fluid within the cylinder 14 to be subjected to high fluid pressure. Such high fluid pressure is communicated through passages 24, 24' to radial outlets in the working tool 12, as shown in FIG. 5, so that the zone of the inner wall of the billet 4 which is being worked by the tool 12 is not only lubricated by the fluid injected there against but because of such high pressure such zone is hydraulically plastically deformed by such high pressure fluid. During such operation the billet 4 being deformed is supported by the engagement of its lower end with a carrying bushing disposed within the lower end of the die. This action has been disclosed in each of the above-identified copending Petkov et al. U.S. patent applications.

After the base plate 16 with the tools 12 have traveled to the lower end of the billets 4 being processed, the tools are removed from the lower ends of broaching rods 7, and the slide 2 is raised by the cylinder 52 so that the broaching rods 7 are fully retracted from the dies 33 and the now fully worked billet 9. Such action will, of course, also have removed the pushing rods 17 and the adjustable compensators or feet 18 thereof from the dies 33'. The rotable table 32 is the raised somewhat, rotated through 90°, and lowered, so as to position the dies 33, 33' for a new billet deforming operation and for the pushing of finished billets 9 from the dies in which they were deformed or finished.

As above-noted, the body 28 has a four-station rotary table 32 mounted thereon. Table 32 carries the respective sets of dies 33, 33 and 33', 33'. As shown in FIG. 5, centrally of the body 28 of the positioning fixture 6 there is a bore 29 in which there is mounted a piston 55 in the form of a flange upon a vertically disposed hollow body 30. Disposed between the upper end of the body 30 and the rotary table 32, is a thrust bearing 31. In order to raise the table 32 fluid under pressure is introduced through a conduit 56 to the space beneath the piston 55 so as to raise table 32 and the sets of dies mounted thereon sufficiently for the lower ends of the dies to clear the upper ends of the carrying bushings 34 on the body 28. Thereupon the four-station rotary table 32 can be rotated 90° so as to bring the dies 33 or 33' carrying the fully worked billets 9 to a position over vertical passages 54 in the body 28, and the now empty dies to a position vertically beneath the raised broaching rods 7. Such turning of the table 32 is effectedd by moving a rack gear 36, which meshes with a gear sector 35 on the rotary table 32, in the requisite direction. The rack 32 is selectively reciprocated by a double-acting hydraulic cylinder 37 the piston rod of which is connected to one end of the rack gear 36. Following this, the four-station rotary table 32 is then lowered into the position thereof shown in FIG. 5 by exhausting fluid from beneath the piston 55 through the conduit 56 while introducing fluid under pressure to the space above the piston through a conduit 57.

The apparatus is now in condition for the feeding of a pair of as yet unworked billets 4 to the respective empty dies 33. As indicated in FIGS. 1, 2 and 6, a loading unit 10, with billets 4, for feeding the billets to positioning fixture 6 is attached by suitable braces to work table 5 of the press 1. Device 10 consists of two hoppers 39 with separators and a one-hand double-grip manipulator 40, gripping one billet 4 from each one of both hoppers 39, and feeding them simultaneously toward two empty dies on the positioning fixture 6. The double-grip manipulator 40 is disposed between both hoppers 39 and is parallel to them. Opposite the loading unit 10, fixed to the work table 5 of the press 1, there is disposed a handling manipulator 11 for the transportation of work tools 12. Unit 10 consists of a base 41 attached to press 1 with two vertical columns 42, along which there moves through a hydraulic cylinder 43, a carriage 44 carrying two horizontally movable columns 45. The latter carry the mechancial arm with two grippers 46.

The apparatus is also equipped with a unit 8 for the transportation of finished parts 9. Such unit includes two inclined conveyors 47 with a common drive, each conveyor having a receiving chute 48 disposed adjacent positioning fixture 6, under both stations, into which the processed parts 9 are pushed.

The above-described apparatus operates as follows: The one-hand double-grip manipulator for servicing the unit 10 for loading billets grips two billets from hoppers 39 and feeds them to the so-called work stations of positioning fixture 6, places billets 4 in dies 33, and retracts, and the handling manipulator 11 for the transportation of work tools 12 feeds them above the work stations. The system for feeding the work fluid fills the high pressure hydrocylinder 14 through check valves 26 and moves its piston 15 downwardly, while passages 24, 24' at the same time are filled up to the throttles 25.

Movable slide 2 of press 1, in line with the unit for hydroplastic processing 3, moves downwardly until broaching rods 7 grasp and press work tools 12 toward billets 4. After the tools 12 have travelled through the lower ends of the passages through finished billets 9 and downwardly through passages 38 and 38' in body 28 manipulator 11 releases work tools 12 from the broaching rods 7.

The work stroke of press 1 starts, and in line with this work tools 12 are poured over with work fluid going down out from throttles 25. During the movement of work tools 12 in billets 4, a first preprocessing of the hole in the billet is affected with abundant lubrication of the surface being processed, without reaching the finished dimension of the part. When work tools 12 fully enter into the billets 4 the tooth gullets of the tool are closed, the work pressure in the high pressure hydraulic cylinder 14 sharply increases, and reaches several thousands of atmospheres, and work tools 12 are moved further downwardly by the action of press 1 to effect the finishing of parts through hydroplastic deformation. Later, as above-described, work tool 12, pass through parts 9, are grasped by the arm of handling manipulator 11, describing a bracket-like trajector ([) and prepares them for the next feeding to the work stations. Movable slide 2 of the press moves upwardly into its initial position while the rotary table 32 of the positioning fixture 6, under the action of hydraulic cylinder 29 incorporated in body 28, is raised by piston 30 and through the toothed rack gear is turned 90°, whereat the dies with the processed parts 9 rest under the pushing rods 17, and then piston 30 lowers rotary table 32 to its inital downward position.

New loading with billets 4 follows, and the operations described so far are repeated. Here, before the start of the work stroke of the movable slide 2, the axial compensators 18 are operated by the respective hydraulic cylinders 22 and rack gears 21 until they are pressed downwardly against the upper ends of the processed parts 9. Later, while two new billets 4 are processed, two finished parts 9 are pushed out, being removed by the transportation unit 8. When movable slide 2 returns upwardly, the axial compensators 18 are also retracted. Most of the operations described above and carried out in sequence are time shared, thus reducing to the minimum the cycle from billet loading to the transportation of finished parts 9.

Although the invention is described and illustrated with reference to a plurality of embodiments thereof, it is to be expressly understood that it is in no way limited to the disclosure of such preferred embodiments but is capable of numerous modifications within the scope of the appended claims.

We claim:

1. Apparatus for the hydroplastic deformation of the interior of a tubular product having a passage therethrough, comprising a vertical hydraulic press having a movable slide and a work table, to the movable slide there being attached a base plate carrying a broaching rod adapted to have a broaching tool mounted on the lower end thereof, the broaching rod thrusting the broach through the passage in the product, means to introduce hydraulic fluid under high pressure between the broaching tool and zone of the inner wall of the passage through the product which is being worked by the broach, whereby such zone is hydraulically plastically deformed by such high pressure fluid, a knock-out rod secured to the base plate, the said knock-out rod lying parallel to the broaching rod and spaced therefrom, a positioning fixture disposed upon the work table, said fixture including a shiftable die-carrying plate having a die mounted thereon adapted to receive therewithin a hollow billet to be processed by the apparatus, and means to shift the die-carrying plate from a first working position in which the die and the billet therein are aligned with the broaching rod to a second working position wherein the die is aligned with the knock-out rod.

2. Apparatus according to claim 1, wherein the die-carrying plate is rotatable about a central vertical axis, and the die-carrying plate is shifted by being rotated about such axis whereby to cause the die to be moved from the first working position to the second working position thereof.

3. The apparatus of claim 2, comprising two broaching rods and two knock-out rods on the base plate, the two broaching rods being disposed in a first set located in a first diametral plane and the two knock-out rods being disposed in a second knock-out plane, the two planes being disposed at right angles with respect to each other, and the die-carrying plate carrying four dies in sets of dies each having two dies positioned symmetrically opposite each other with respect to the center of rotation of the die-carrying plate, the planes containing the dies of the first set and the dies of the second set being disposed at right angles with respect to each other, in the first working position of the die-carrying plate the broaching rods being disposed in alignment with the dies of the first set of dies and the knock-out rods being disposed in alignment with the dies of the second set of dies, and in the second working position of the die-carrying plate the dies of the second set being disposed in alignment with the broaching rods and the dies of the first set being disposed in alignment with the knock-out rods.

4. Apparatus according to claim 1, wherein the base plate is mounted for reciprocation toward and away from a carrying plate attached to the slide of the press, and a high pressure hydraulic cylinder provided with a piston mounted between the carrying plate and the base plate, whereby when the press slide is thrust toward the dies in an operative stroke to perform a broaching and a knock-out function, the high pressure hydraulic cylinder and piston combination is subjected to increased hydraulic pressure.

5. Apparatus according to claim 1, wherein the high pressure hydraulic cylinder and piston combination is disposed centrally of and coaxial with the carrying plate and the base plate, the positioning fixture being disposed coaxially of the carrying plate and the base plate, and comprising a unit provided with a handling manipulator for loading billets and beneath the work table of the press there is provided a transportation unit for the removal of finished tubular products.

6. Apparatus according to claim 4, wherein the broaching rod has a longitudinal passage therethrough which connects with a passage internally of the work tool mounted on the broaching rod, and comprising fluid conducting conduit means connecting the interior of the high pressure hydraulic cylinder with the passage through the broaching rod and thence to the interior of the work tool, there being a throttle valve interposed between the passage in the broaching rod and the interior of the work tool.

7. Apparatus according to claim 1, wherein the knock-out rod is provided with means for adjusting its effective axial length, and means for operating said adjusting means at the beginning of each knock-out operation performed by the apparatus.

8. Apparatus according to claim 1, wherein the positioning fixture includes a body affixed to the work table of the press, said body having four concentrically located holes and one central hole therethrough, the four concentrically located holes being adapted to receive the lower end of a broaching rod and the work tool mounted thereon when the work tool has traveled completely downwardly through the tubular product being deformed, the positioning fixture having a four station rotary table mounted thereon, said table having four concentrically located holes therein aligned with the four concentrically located hole in the body of the positioning fixture, and comprising means locking the four station table on the body of the positioning fixture against turning unless such table is raised from said body.

9. Apparatus in accordance with claim 8, comprising a hydraulic cylinder and piston means mounted centrally of the body of the work fixture coaxial thereof, said last-named cylinder and piston combination being adapted cyclically to raise the four station rotary table from the body of the positioning fixture whereby to permit the turning of the rotary table from one of its working positions to the other of its working positions.

10. Apparatus according to claim 9, wherein the means for turning the four station rotary table when it is raised from the body of the positioning fixture comprises a ring gear extending through a part of a revolution secured to the four station work table and a hydraulic cylinder piston combination wherein the piston is connected to a rack gear meshing with said ring gear.

11. Apparatus in accordance with claim 5, wherein the device for loading billets into the dies includes two individual hoppers with dividers and a one-hand double-grip manipulator disposed between the two hoppers and parallel to them.

12. Apparatus in accordance with claim 5, wherein the handling manipulator consists of a base attached to the frame of the press through two vertical columns, a carriage being disposed for vertical movement on said vertical columns, said carriage being connected to a hydraulic cylinder and piston combination carrying horizontal columns, and a mechanical arm secured to said horizontal column.

* * * * *